June 23, 1925.
L. J. PIANAROSA ET AL
1,542,907
RUBBER CUTTING-OFF MACHINE
Filed March 10, 1922     5 Sheets-Sheet 1
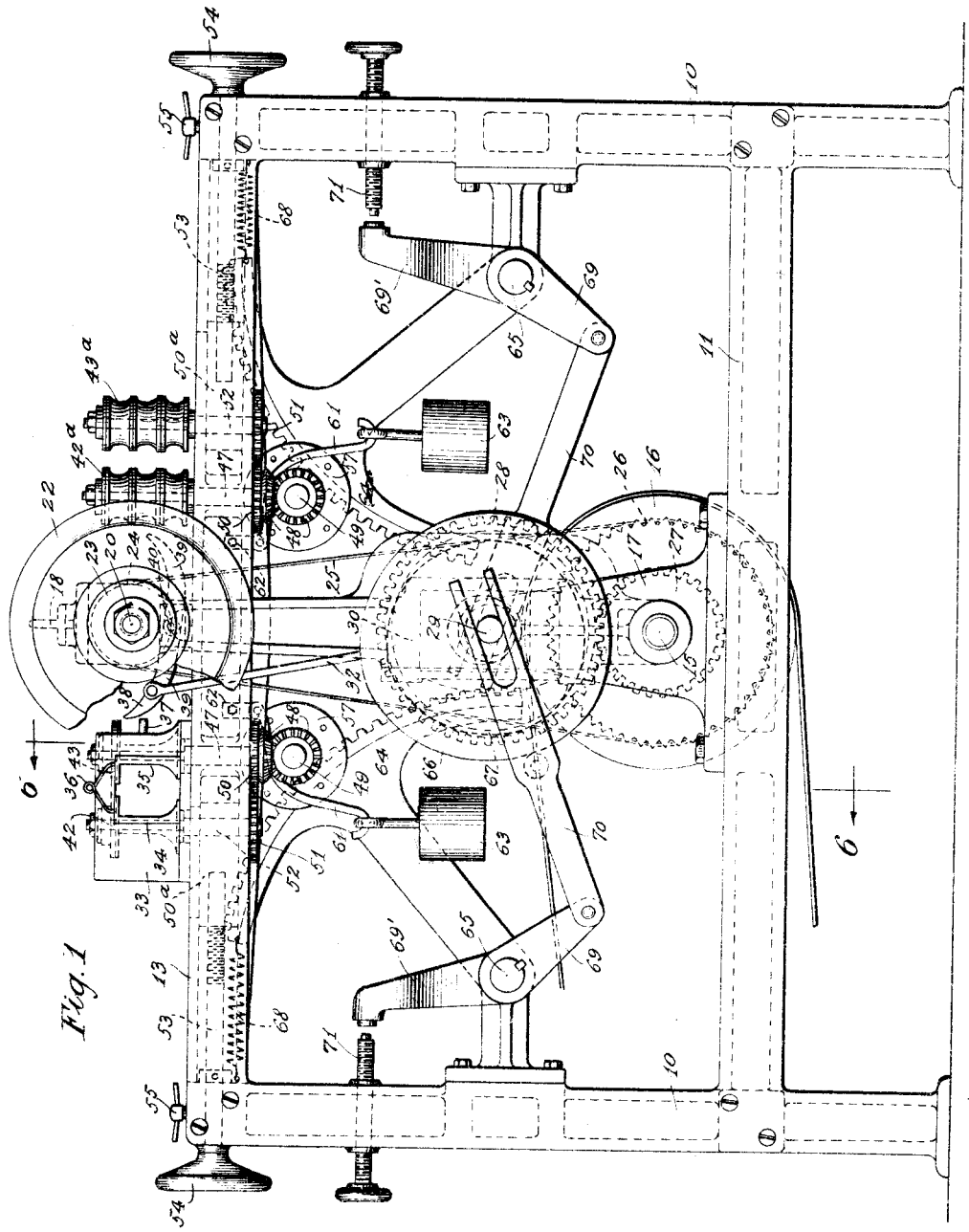
INVENTORS
*Louis J. Pianarosa and*
BY   *William Nicholas*
*Chamberlain & Newman* ATTORNEYS.

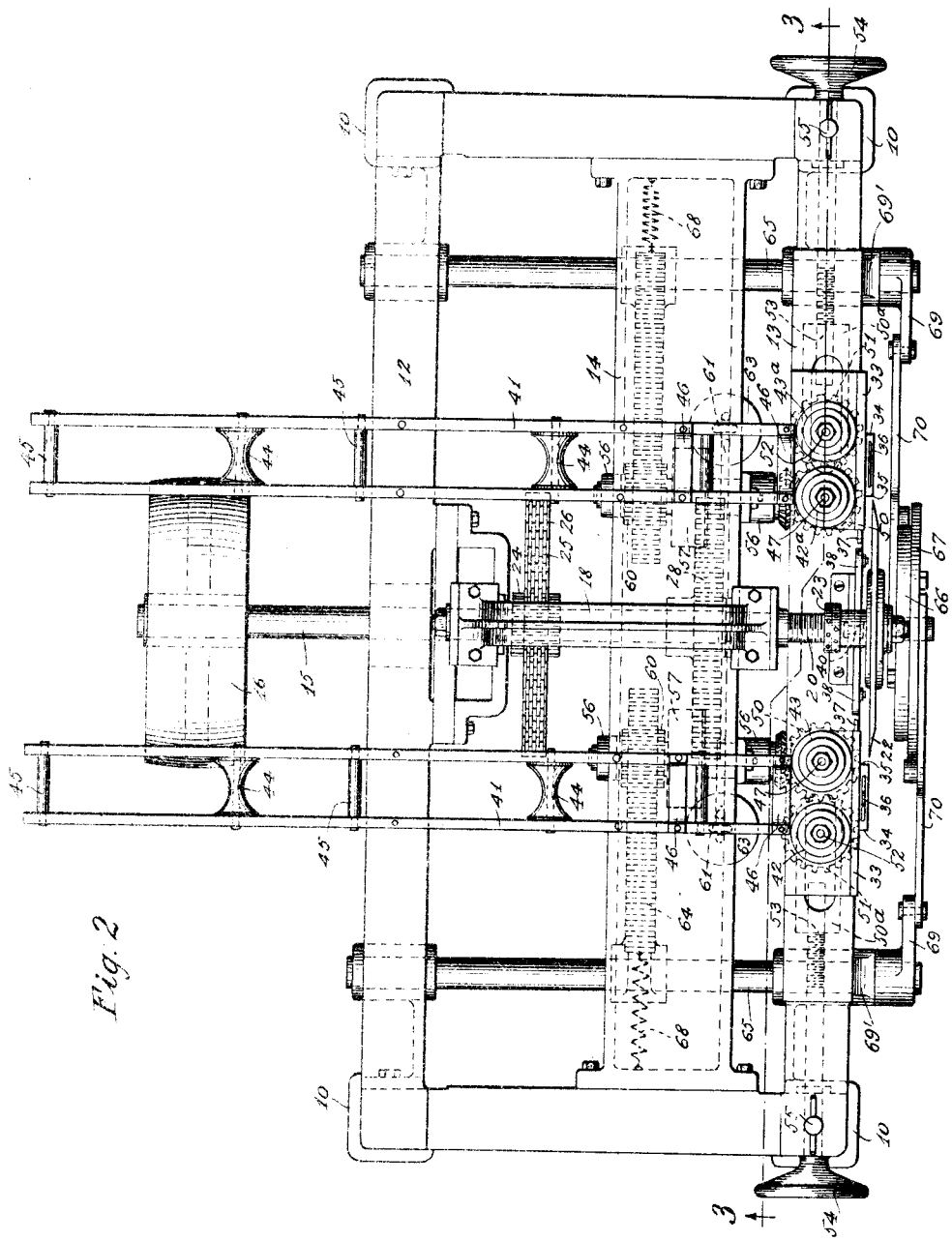

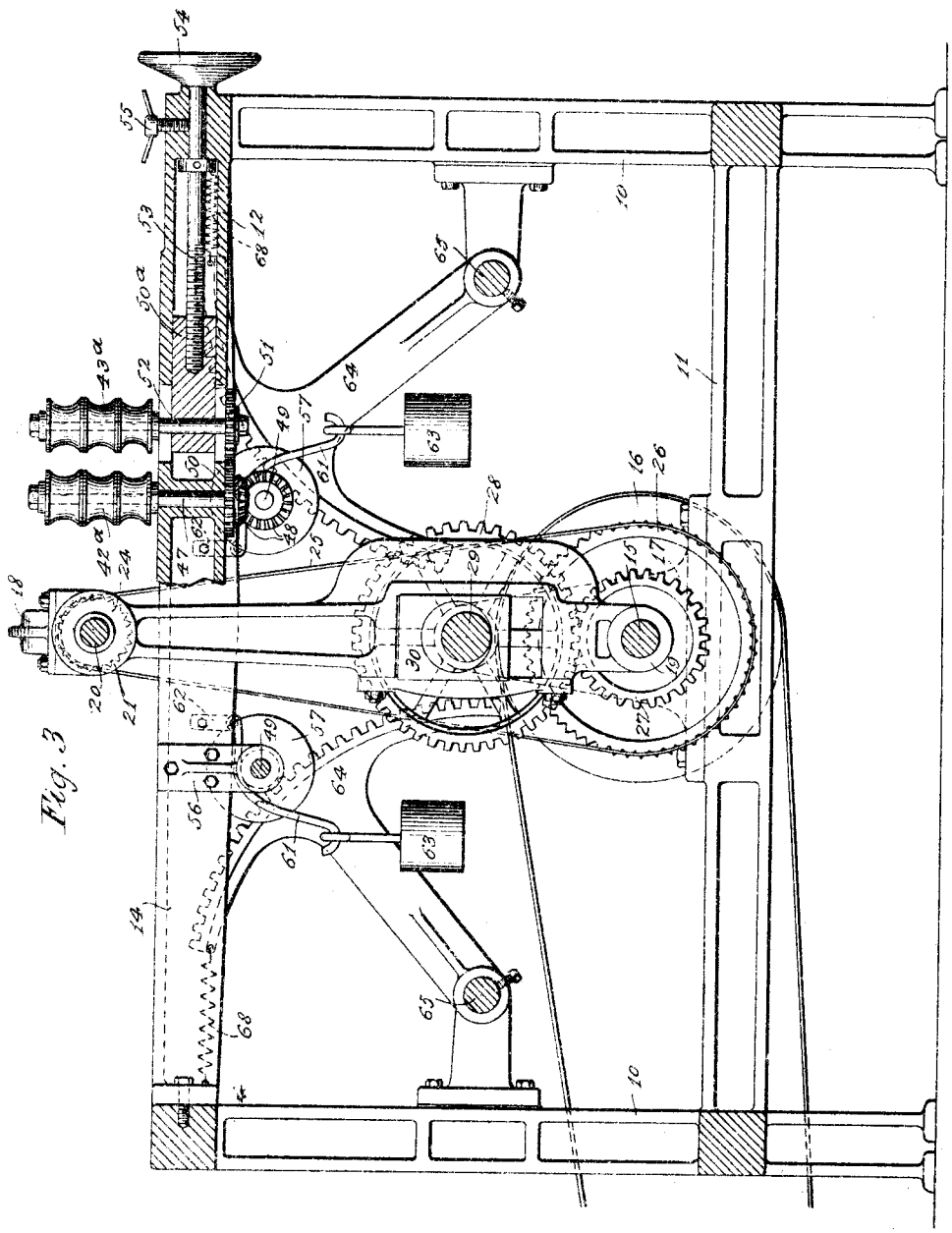

June 23, 1925. 1,542,907
L. J. PIANAROSA ET AL
RUBBER CUTTING-OFF MACHINE
Filed March 10, 1922 5 Sheets-Sheet 4
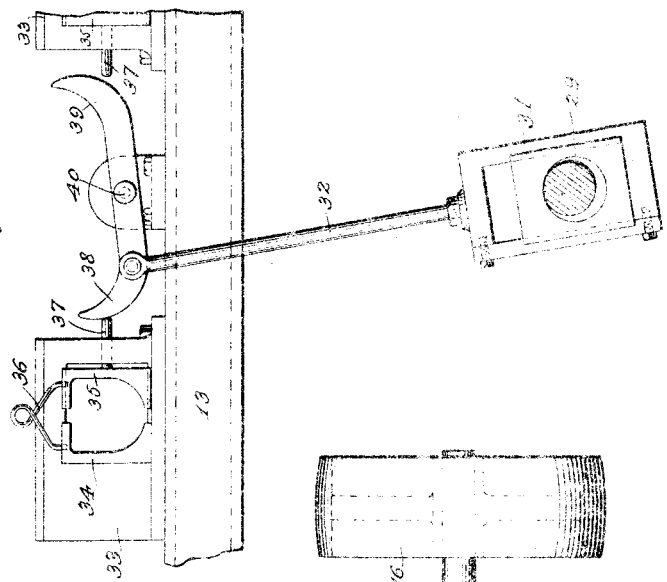
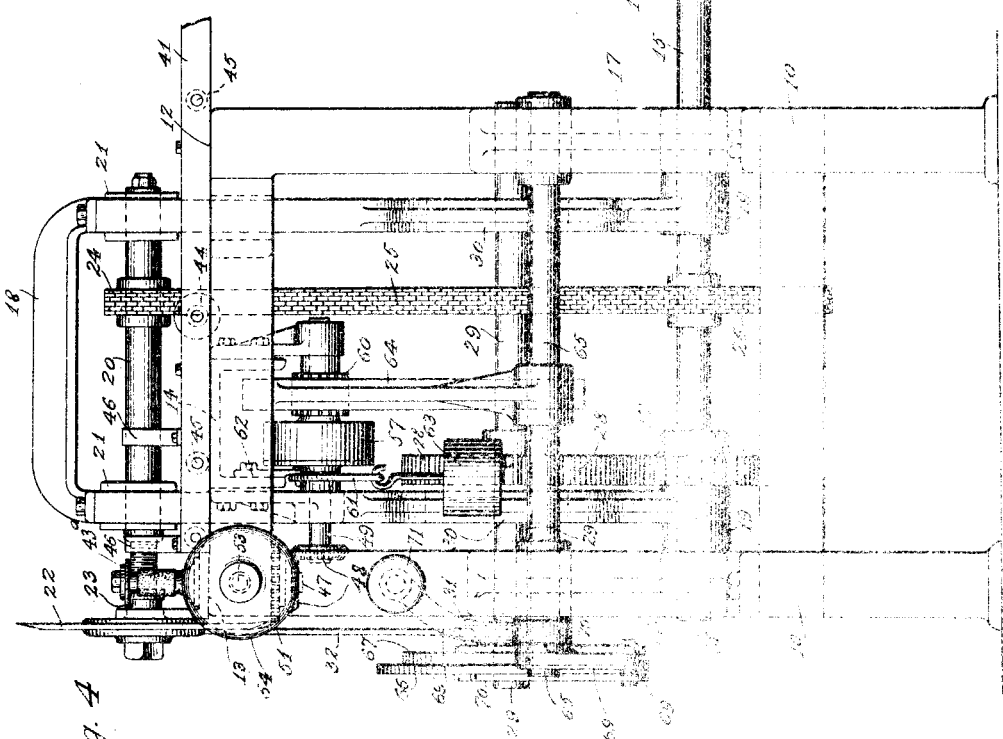
INVENTORS
Lowis J. Pianarosa and
BY William Nicholas
Chamberlain & Newman ATTORNEYS.

June 23, 1925.  L. J. PIANAROSA ET AL  1,542,907
RUBBER CUTTING-OFF MACHINE
Filed March 10, 1922   5 Sheets-Sheet 4
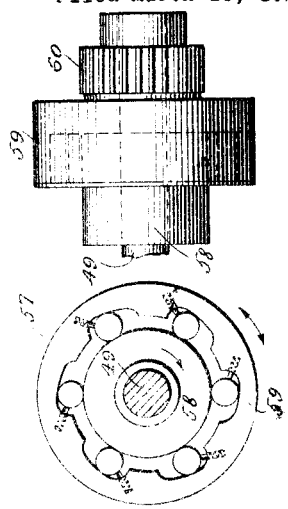
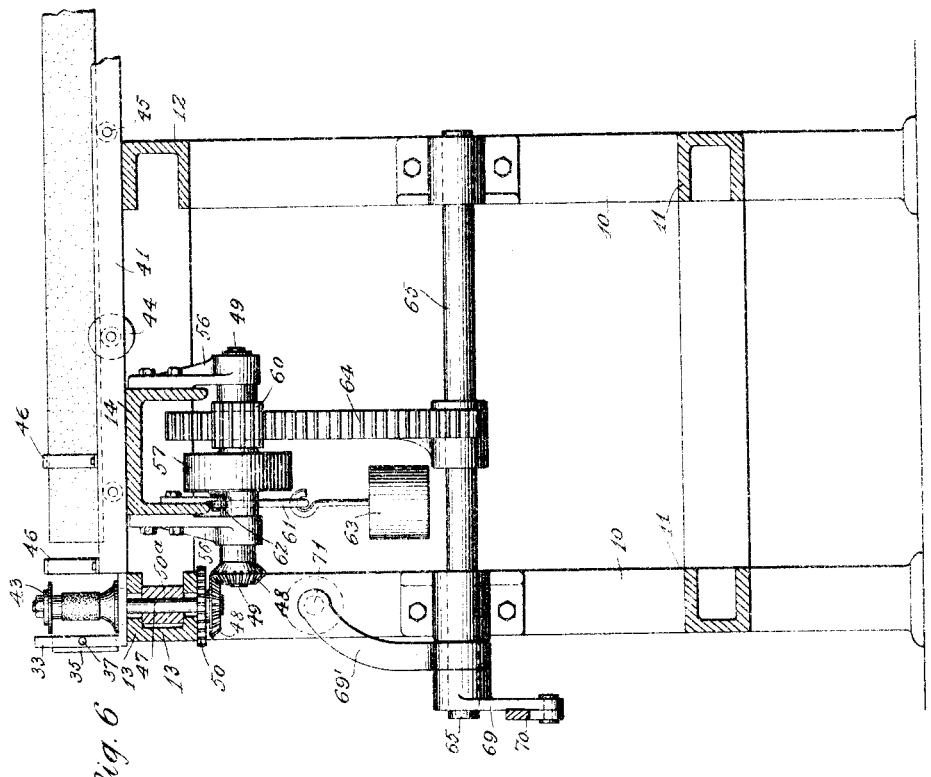
INVENTORS
Lewis J. Pianarosa and
BY William Nicholas
Chamberlain & Newman ATTORNEYS.

Patented June 23, 1925.

1,542,907

UNITED STATES PATENT OFFICE.

LOUIS J. PIANAROSA, OF TRENTON, NEW JERSEY, AND WILLIAM NICHOLAS, OF BRIDGEPORT, CONNECTICUT, ASSIGNORS TO THE BLACK ROCK MFG. CO., OF BRIDGEPORT, CONNECTICUT, A CORPORATION OF CONNECTICUT.

RUBBER-CUTTING-OFF MACHINE.

Application filed March 10, 1922. Serial No. 542,546.

*To all whom it may concern:*

Be it known that Louis J. Pianarosa and William Nicholas, a citizen of the United States and a subject of the King of Great Britain, respectively, and residents of Trenton and Bridgeport, respectively, in the counties of Mercer and Fairfield, respectively, and States of New Jersey and Connecticut, respectively, have invented certain new and useful Improvements in Rubber-Cutting-Off Machines, of which the following is a specification.

This invention relates to new and useful improvements in rubber cutting machines and more particularly to what may be called a rubber cutting-off machine.

The machine is especially designed for use in cutting-off relatively short lengths or pieces, from bars of rubber stock of various forms and diameters, such as are designated as blanks from which to form commercial products in forming dies and by vulcanizing or which may constitute completed products adapted for commercial purposes.

The principal object of the invention is to produce a machine which will be very rapid in its operation and capable of producing a larger number of rubber pieces in a given length of time; also to provide a machine which is capable of handling a large variety of shapes and sizes of stock and thus producing a great variety of rubber articles; further to design a machine so that it can be made to cut upon several bars of rubber stock of different kinds and sizes at the same time, and finally to construct the machine in a simple and durable manner, so that its power of operation and cost of up-keep will be nominal consistent with the amount of work accomplished.

With these and other objects in view the invention resides and consists in the construction and novel combination and arrangement of parts hereinafter more fully described, illustrated in the accompanying drawings, and pointed out in claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a front elevation of our improved rubber cutting-off machine, part of the rotary cutting knife being broken away;

Fig. 2 shows a plan view of the machine shown in Fig. 1;

Fig. 3 is a vertical cross section taken on line 3—3 of Fig. 2;

Fig. 4 shows an end view as seen from the right of Figs. 1 and 2;

Fig. 5 is an enlarged detail view of the rubber stock clamping mechanisms;

Fig. 6 is a vertical cross section taken on line 6—6 of Fig. 1; and

Fig. 7 shows a side and elevational view respectively on an enlarged scale of one of the clutches, through which the feeding rolls are operated.

The machine is double acting in that it includes two cutting stations and a rotary cutting knife that moves from one cutting station to the other and serves to cut from two or more bars of stock at the same time, and is further constructed so that the rotatable cutting knife will be performing cutting operations the greater part of the time, while the machine is operating.

Briefly speaking, the machine comprises a rotary cutting knife that is mounted on a shaft journaled in the swinging end portion of a carrier hingedly mounted to swing to and fro, and so that the knife is alternately brought into engagement with the oppositely positioned bars of stock. These bars of stock, in turn, are alternately fed forward required distances in position for succeeding cuts, and are operatively connected with the driving parts of the machine so that the feeding of the one bar is effected while the knife is cutting through the other. The cutting operations are performed quickly by the rotary cutting knife swinging backward and forward operating first upon one bar of stock and then upon the other, thereby cutting when moving in either direction.

Referring in detail to the characters of reference marked upon the drawings, it will be seen that the operative parts of the machine are supported in a frame work which is of a table-like formation, comprising corner legs 10, lower cross members 11 and top cross members 12, 13 and 14.

15 represents the main driving shaft provided with a belt pulley 16 through which power is applied to the machine. This driving shaft is journaled in bearings 17—17 mounted upon the lower cross members 11 and as will be seen is positioned crosswise of the machine and midway between the two ends thereof. This shaft not only serves as an operating means for other parts of the machine, but also serves as a bearing for the reciprocating carrier 18 which is pivotedly supported thereon as at 19—19 in a manner to permit its upper end portion, carrying the knife, to be rocked to and fro. The shaft 20 is journaled in bearings 21 of the carrier and supports the knife 22 which is adjustably mounted upon said shaft by means of the nuts 23 adjustably mounted upon the threaded portion of the shaft. The rotatable cutting knife 22 may be of any desired or preferred size and is adapted to be removed from the shaft 20 and to be replaced by larger or smaller knives should occasion require. A small sprocket wheel 24 is mounted upon this shaft 20 and is connected to be driven by a chain belt 25 from the sprocket wheel 26 upon the main driving shaft 15. Said driving wheel being proportionately larger than the driven wheel so that the latter and its shaft and cutting blade may be operated at a higher rate of speed.

Upon the main driving shaft 15 is also mounted a gear 27 that meshes with and drives a larger gear 28 upon a cam shaft 29 positioned immediately above the before mentioned driving shaft, and journaled in the upper portions of the before mentioned bracket 17 that supports said driving shaft. A pair of eccentrics 30—30 carried on this shaft and operatively positioned in the bifurcated arms of the carrier, serves to oscillate the arms upon their pivots and to throw the carrier to and fro for the engagement and disengagement of the knife with the bars of stock to be cut. A third eccentric 31 is positioned upon the forward end of the said shaft 29 and is connected by a rod 32 with clamping devices for engaging the separate bars of stock during the cutting operations.

There are two of these clamping devices, one for each side of the machine and each is obviously located in alignment therewith so that the stock will be passed through the clamps in the feeding operations. The two clamps shown are alike in construction and as will be seen each comprise a frame plate 33 which is secured to the cross member 13 of the frame and is provided with an opening in which is positioned a fixed jaw 34 and a movable jaw 35, the latter being held in an open position by means of a spring 36 and provided with a shank 37 that extends through the frame plate and is engaged by one of the cam faces 38 of the lever 39 pivoted at 40. This lever as will be noted is provided with opposite cam faced end portions, one for engaging and operating one clamp and the other for operating the second clamp, and is so connected through the link 32 with the eccentric 31 as to insure the closing of the one clamp at a time when the other is released and to release the first mentioned clamp while closing the second. The particular formation of the inner faces of the clamping jaws may be varied to properly conform to the peripheral surface of the different shapes of rubber bars to be passed therethrough, so as to insure a uniform engagement of the same upon all sides. The opening as shown in the drawing formed by the particular shape of the inner edge of the clamping dies illustrated is such as would be adapted to clamp a bar of rubber shoe heel stock. It will be obvious of course that round or square stock can be similarly clamped by slightly different shaped dies and likewise cut to equally as good advantage and that different shape clamping dies suitable for holding two or more bars at the same time, may be substituted. As constructed the length of the pieces of rubber to be cut are determined by the position of the adjusting screw 71 against which the arms 69' seats with each rotation of the cam.

These bars of stock (see Fig. 6) are fed and supported in position to be operated upon by the rotary knife, which is reciprocated intermediate of and at a right angle to the said bars so that the knife is run through the bars crosswise in a way to cut off relatively short pieces which may be used for various purposes either in their present relatively soft state, or may be shaped and vulcanized as in the art of rubber shoe heel making. These bars of stock are supported in the two guide ways 41—41 secured upon the members 12, 13 and 14 of the frame and are alternately drawn forward in position to be clamped by the feed rolls 42 and 43. The bars are slidably supported on rolls 44 and 45 of the guide ways and the said guide ways are also provided with loops 46 through which the said stock is fed. At the left in Fig. 1 is shown but one pair of feed rolls, designated as 42, and 43, which obviously serve to feed a single bar or rubber, whereas at the right of said figure and as is more clearly shown in Fig. 3 a series of feed rolls 42ª and 43ª are shown, and whereby three bars of stock of smaller diameter may be simultaneously fed, positioned clamped and cut, thereby increasing the output of the machine, so far as the number of pieces are concerned. From this it will be seen that one or more pairs of rolls could be used upon either side so that if the size of the stock to be cut is small a greater number of pieces could be cut off in the same period of time.

Aside from the feature of using one or a series of feed rolls upon one or both sides of the machine, the remainder of the feeding mechanism as employed in our machine is substantially the same and therefore the same reference characters will be employed for designating the like parts of the two sets. In this respect it will be seen that the rolls 42 and 42' are mounted upon positively driven feed shafts 47 that are journalled in the member 13 of the frame and operated through beveled pinions 48 and an intermittently operated shaft 49. This feed shaft 47 is also provided with a gear 50 which meshes with and drives a similar gear 51 upon the feed shaft 52. The last named shaft is mounted in a block 53 slidably mounted in the top member 13 of the frame so that the roll or rolls upon one shaft may be adjusted to and from the roll or rolls upon the other shaft, to accommodate different thicknesses of stock. The two slide-blocks 50ᵃ together with their shafts and feed rolls are designed to be adjusted in and out for different thicknesses of stock, by means of their adjusting screws 53 rotatably mounted in the frame and carrying hand wheels 54 upon their outer ends. Further differences in thickness of stock may be provided for by different thickness of feed rolls or by any other suitable means. Set screws 55 serve to secure these adjusting screws in their required position.

The shaft 49 is journaled in brackets 56 hung from the frame member 14 and is operated through a clutch 57, the driven member 58 of which is secured to the said shaft while the driving member 59 of said clutch, formed integral with the hub and gear 60 is loosely mounted upon the said shaft. The movement imparted to the pinion and driving member of the friction clutch is an alternate forward and backward rotation whereby alternately forward movements only are imparted to the driven clutch member. Said driving clutch member being held against backward movement by a friction brake member 61 which is pivotedly connected to the frame as at 62 and provided upon its outer end with a weight 63 which serves to hold the said brake against the hub of the driven clutch member so as to retain it against backward rotation.

The shaft 49 and its gear 60 are preferably operated through segments 64 secured upon the rocker shaft 65 journaled in the frame and are operated by cams 66 and 67, mounted upon the outer end of the above mentioned shaft 99, which serves to throw said shaft and segments downward against the action of their springs 68 in a way to impart the alternate clockwise and counterclockwise rotations to the said feed shafts 48. As shown in the drawing an arm 69 is mounted upon each of the shafts 65 and 70 links 70 provided with rolls connect the arms with the cams 66 and 67 in a manner to operate the former through the latter. The spring 68 has one end connected to the racks and the other to the frame of the machine, and serves to pull the racks up and hold the roll of the links against the cams in a way to insure the operation of the said racks and feed mechanisms through the operation of the cams.

Having thus described our invention, what we claim and desire to secure by Letters Patent is:

1. The combination with two feeding devices, each for feeding a bar of rubber or the like lengthwise, clamping devices for holding the said bars of rubber in position after being fed, a rotary knife, a swinging carrier pivotally mounted at one end and supporting the rotary knife at the other end and operatively mounted as between the two said bars of stock, and means for swinging the carrier backward and forward about said pivot to bring the knife into engagement with the said stock.

2. In a rubber cutting-off machine, the combination with separate mechanisms for feeding bars of rubber stock or the like lengthwise predetermined distances, devices for alternately clamping the said bars of stock, a carrier mounted to swing about a fixed pivot between the two said bars of rubber, a rotatable knife mounted in the carrier, and adapted to swing in an arc at each side of a vertical line in a plane at right angles to the length of the bars to alternately cut pieces from the said bars.

3. In a rubber cutting-off machine, the combination with a frame, of a pair of feed rolls mounted thereon, a guide way in alignment with the feed rolls to direct a bar of rubber or the like to the said rolls, means for alternately operating the said rolls to intermittently feed the bar of rubber forward predetermined distances, clamping device for holding the stock in position, and a rotary knife operating in an arc and in a plane at a right angle to said bar in a way to cut the same crosswise.

4. In a rubber cutting-off machine, a carrier mounted to swing about a fixed pivot, a rotary cutting knife mounted in the carrier, means on opposite sides of the carrier for supporting bars of rubber or the like to be cut by the knife, means adapted to swing said carrier to bring said knife alternately across the bars, and means for alternately feeding the said bars of rubber in position to be cut, at a time when disengaged by the said knife.

5. In a rubber cutting-off machine, the combination of a carrier mounted to swing about a fixed pivot, a rotary cutting knife mounted in the carrier, means positioned in line with the throw of the carrier and knife for supporting bars of stock to be cut by the knife, means adapted to swing said carrier to bring said knife alternately across the bars, means for alternately feeding the bars on opposite sides of the knife forward at a time when disengaged by the said knife, and means for alternately clamping the said bars of stock at a time when engaged by the said knife.

6. In a rubber cutting-off machine, the combination with a pair of feed shafts each adapted to hold one or more feed rolls, a guiding means for supporting and directing a bar of rubber or the like between said rolls, means for alternately operating the rolls to feed the bar, means for alternately clamping the bars when in positions of rest, a rotary cutting knife, and means for swinging the knife in an arc to and from the rubber bars for cutting off the same.

7. In a rubber cutting-off machine, the combination of a feeding device comprising a pair of feed shafts and feed rolls mounted thereon, said feed shafts being adjustable with respect to each other to accommodate larger or smaller rolls, a guide way for directing a continuous bar of rubber or the like between said rolls, means forwardly of the feed rolls for positively clamping the said bar in position, and a knife forwardly of the clamping means for slicing off pieces from the said bar, with the end to be cut projecting from the clamping means.

8. In a rubber cutting-off machine, the combination with a pair of feed shafts each adapted to hold one or more feed rolls, a guiding means for supporting and directing a bar of rubber or the like between said rolls, means for alternately operating the rolls to feed the bar, including a pair of shafts one operated by the other, a clutch and operating means for the clutch, a rotary knife, means between the rolls and knife for alternately clamping the bars when in a position of rest, and means for feeding the knife to and from the rubber bars for cutting off the same.

9. In a rubber cutting-off machine, the combination of a feeding device comprising a pair of feed shafts, feed rolls mounted thereon, said feed shafts being operated one by the other and means for adjusting one with respect to the other to feed large or smaller rolls, a guide way for directing a bar of rubber or the like between said rolls, means forwardly of the rolls for clamping the said bar in position, and a knife forwardly of the clamping means for slicing off pieces of rubber from the said bar.

10. In a rubber cutting-off machine, the combination of a frame, a driving shaft, a vertically disposed carrier hingedly mounted upon said shaft, a driven shaft mounted in the upper end of the carrier, means for driving the latter shaft from the former, a rotary knife mounted on the driven shaft, a third shaft intermediate of the two said shafts having eccentric connections with the said carrier for moving the same backward and forward, rubber bar feeding and clamping devices positioned on opposite sides of the carrier in a manner to feed and support bars of rubber in position to be alternately cut off by the rotary knife when brought into engagement by the swinging movement of the carrier.

11. In a rubber cutting-off machine, the combination of a frame, a driving shaft, a vertically disposed carrier hingedly mounted upon said shaft, a driven shaft mounted in the upper end of the carrier, means for driving the latter shaft from the former, a rotary knife mounted upon the driven shaft, a third shaft intermediate of the two said shafts connected to reciprocate the said carrier, means for driving the last named shaft from the driving shaft and means for driving the knife shaft from the driving shaft, a rubber bar feeding and gripping device positioned at one side of the carrier to support stock in alignment with the movement of the rotary knife, means for operating the said feeding device including a cam, and connections therefrom to the said feeding device.

12. In a rubber cutting-off machine, the combination of a reciprocating carrier, a rotary cutting knife mounted in the carrier, means on opposite sides of the carrier for supporting bars of rubber to be cut by the knife, means for feeding the said bars of rubber in position to be cut, and means for adjusting the feeding mechanism for changing the lengths of the feed and pieces to be cut during the operation of the machine.

13. In a rubber cutting-off machine, the combination with a cutter, of a device for feeding bars of rubber to be cut, comprising feed shafts and feed rolls, means for alternately operating said feed shafts and rolls predetermined amounts, a cam and rack for manipulating said operating device, and adjustable means for limiting the amount of throw of the rack and the resultant amount of the feed of the rolls during the operation of the machine.

14. In a rubber cutting-off machine, a carrier mounted to swing about a fixed pivot, a rotary cutting knife mounted in the carrier, a cam shaft, cam means thereon adapted to swing said carrier to and fro at either side of a vertical line, means on opposite sides of the carrier for supporting bars of rubber or the like to be cut by the knife, and means for alternately feeding the bars of rubber in position to be cut, at a time when disengaged by the knife.

15. In a rubber cutting-off machine, a carrier mounted to swing about a fixed pivot, a rotary cutting knife mounted in the carrier, a cam shaft, cam means thereon adapted to swing said carrier to and fro at either side of a vertical line, means on opposite sides of the carrier for supporting bars of rubber or the like to be cut by the knife, means for alternately feeding the bars of rubber in position to be cut, at a time when disengaged by the knife, and cam means on said cam shaft adapted to operate said feeding means.

16. In a rubber cutting-off machine, a carrier mounted to swing about a fixed pivot, a rotary cutting knife mounted in the carrier, a cam shaft, cam means thereon adapted to swing said carrier to and fro at either side of a vertical line, means on opposite sides of a carrier for supporting bars of rubber or the like to be cut by the knife, means for alternately feeding the bars of rubber in position to be cut, at a time when disengaged by the knife, clamping means adapted to alternately clamp said bars of rubber while being cut by the knife, and cam means on said cam shaft adapted to operate said clamping means.

Signed at Trenton, in the county of Mercer and State of New Jersey, and Bridgeport, in the county of Fairfield and State of Connecticut, respectively, these 7th and 9th days of March, respectively, 1922.

LOUIS J. PIANAROSA.

Witnesses as to PIANAROSA:
  MICHAEL COMMINI,
  VALENZANO BRILLANTINI.

WILLIAM NICHOLAS.

Witnesses as to NICHOLAS:
  LESLIE D. DAVIS,
  MARY E. CULLEN.